United States Patent
Morimoto (10) Patent No.: US 7,420,967 B2
(45) Date of Patent: Sep. 2, 2008

(54) METHOD AND SYSTEM FOR DATA TRANSFER

(75) Inventor: Hiroyuki Morimoto, Kanagawa (JP)

(73) Assignee: Texas Instruments Incorporated, Dallas, TX (US)

( * ) Notice: Subject to any disclaimer, the term of this patent is extended or adjusted under 35 U.S.C. 154(b) by 909 days.

(21) Appl. No.: 10/769,499

(22) Filed: Jan. 30, 2004

(65) Prior Publication Data
US 2005/0021865 A1 Jan. 27, 2005

(30) Foreign Application Priority Data
Feb. 6, 2003 (JP) ............................. 2003-029481

(51) Int. Cl.
*H04I 4/50* (2006.01)
(52) U.S. Cl. .................... 370/368; 714/764; 386/91
(58) Field of Classification Search .................. 370/352
See application file for complete search history.

(56) References Cited

U.S. PATENT DOCUMENTS 3,639,693 A * 2/1972 Bartlett et al. ............... 370/368
4,733,396 A * 3/1988 Baldwin et al. ............. 714/764
5,191,437 A * 3/1993 Kim ............................ 386/91

* cited by examiner

*Primary Examiner*—Creighton Smith
(74) *Attorney, Agent, or Firm*—Warren L. Franz; Wade J. Brady, III; Frederick J. Telecky, Jr.

(57) ABSTRACT

The objective of the invention is to provide a type of data transfer system for generating plural timing signals, etc. for any device. Data transfer system A transfers plural data blocks received with one input channel to plural output channels. Each data block contains data, destination identification indicating the output channel to be transferred to, first timing information, and second timing information. System A has selection output unit 32. As a result, each received data block is sent to one output channel indicated by the destination identification in the data block. Also, system A has first timing control unit 300 and second timing control unit 302. As a result, the received data blocks are transferred at a first relative timing indicated by the first timing information or a second relative timing indicated by the second timing information with respect to a time standard.

9 Claims, 10 Drawing Sheets

| EXAMPLE OF PROGRAM DATA | | | | |
|---|---|---|---|---|
| | POLARITY DATA | TERMINAL DATA | DELAY DATA | BASIC TIMING |
| ADDRESS 0 | 0 | P4 | 3 | 1000 |
| ADDRESS 1 | 1 | P2 | 0 | 1001 |
| ADDRESS 2 | 0 | P3 | 1 | 1002 |
| ADDRESS 3 | 1 | P1 | 0 | 1003 |

| PIN NAME | I/O | EXPLANATION |
| --- | --- | --- |
| VD | I | VERTICAL SYNCHRONIZATION SIGNAL INPUT |
| HD | I | HORIZONTAL SYNCHRONIZATION SIGNAL INPUT |
| TRIG | I | EXTERNAL TRIGGER SIGNAL INPUT |
| CK | I | MASTER CLOCK INPUT |
| CKE | I | CLOCK FEED ENABLE, FUNCTION ON/OFF AND POLARITY ARE ASSIGNED WITH REGISTER |
| XCLR | I | OVERALL RESET SIGNAL INPUT, ASYNCHRONOUS |
| MDATA | I | DATA INPUT FROM MEMORY |
| MTRIG | O | DATA READ TRIGGER OUTPUT TO MEMORY |
| V[11:0] | O | FOR CCD VERTICAL TRANSFER SYSTEM SIGNAL OUTPUT |
| CLPDM | O | CLAMP DUMMY OUTPUT |
| CLPOB | O | CLAMP OPTICAL BLACK |
| PBLK | O | PRE-BLANKING |
| HBLK | O | HORIZONTAL (H1/H2) BLANKING |
| KGIV | O | MASTER/FREQUENCY DIVISION OUTPUT SWITCHING OF HORIZONTAL (H1/H2) PULSES |
| P[110] | O | OUTPUT OF CH, WE, AND OTHER GENERAL-PURPOSE PINS |
| FIELD | O | FIELD INDEX (ODD/EVEN) SIGNAL OUTPUT |
| SUB | O | OUTPUT OF PULSE FOR ELECTRONIC SHUTTER |
| STROBE | O | STROBE CONTROL PULSE OUTPUT |
| MSHUT | O | MECHANICAL SHUTTER CONTROL OUTPUT |
| SUBSW1 | O | CCD SUBSTRATE POTENTIAL SWITCH 1 |
| SUBSW2 | O | CCD SUBSTRATE POTENTIAL SWITCH 2 |

H PROGRAM ON H-MEMORY
* IT IS ASSUMED THAT THE GENERAL-PURPOSE PIN
P1 IS ASSIGNED AS H-CONTROL PIN (H1/H2)

| ADDRESS | DATA | | | |
|---|---|---|---|---|
| #HA1 | 00<br>(NO DELAY) | 00<br>(SET AT "0") | 10001<br>(HBLK PIN) | 0_0000_0011_0100<br>(52nd PIXEL) |
| #HA1+1 | 00<br>(NO DELAY) | 01<br>(SET AT "1") | 10001<br>(HBLK PIN) | 0_0010_1000_0100<br>(644th PIXEL) |
| #HA1+2 | 00<br>(NO DELAY) | 00<br>(SET AT "0") | 00010<br>(V[1] PIN) | 0_0101_0001_0000<br>(1296th PIXEL) |
| #HA1+3 | 00<br>(NO DELAY) | 01<br>(SET AT "1") | 00100<br>(V[3] PIN) | 0_0101_0110_0100<br>(1380th PIXEL) |
| #HA1+4 | 00<br>(NO DELAY) | 00<br>(SET AT "0") | 00011<br>(V[2] PIN) | 0_0101_1000_1100<br>(1420th PIXEL) |
| #HA1+5 | 00<br>(NO DELAY) | 00<br>(SET AT "0") | 00100<br>(V[3] PIN) | 0_0101_1100_0100<br>(1460th PIXEL) |

*FIG. 15*

| ADDRESS | PROGRAM ON H-MEMORY DATA | | |
|---|---|---|---|
| #HA1+? | 0001 (START OF MODULO OPERATION 1) | 11111 GENERAL COMMAND | 0_0000_1000_1100 (140th PIXEL) |
| ⋮ | ⋮ | ⋮ | ⋮ |
| #HA2+? | 1000 (START OF MODULO OPERATION 1) | 11111 GENERAL COMMAND | 0_0111_1101_0000 (2000th PIXEL) |

| ADDRESS | PROGRAM ON M-MEMORY | | | |
|---|---|---|---|---|
| #MA1 | 00 (WITHOUT DELAY) | 0 (SET AT "0") | 0001 (V[0] PIN) | 0_0000_0000 (0th PIXEL) |
| #MA1+1 | 00 (WITHOUT DELAY) | 0 (SET AT "0") | 0010 (V[1] PIN) | 0_0001_0010 (18th PIXEL) |
| #MA1+2 | 01 (WITH 1 CK DELAY) | 1 (SET AT "1") | 0001 (V[0] PIN) | 0_0001_1111 (31st PIXEL) |
| #MA1+3 | 00 (WITHOUT DELAY) | 0 (SET AT "0") | 0011 (V[2] PIN) | 0_0010_1000 (32nd PIXEL) |
| ⋮ | ⋮ | ⋮ | | ⋮ |
| #MA1+? | XXX VOID (3 BIT) | 1111 (REPEAT COMMAND) | | 0_1000_0000 (108th PIXEL) |

(SET AT "0") (32nd PIXEL)

M-COUNTER IS RESET, RETURN TO #MA1

MA1+2 and #MA1+3 EXECUTED AT THE SAME TIME

METHOD AND SYSTEM FOR DATA TRANSFER

FIELD OF THE INVENTION

The present invention pertains to a data transfer method and system for use in generation and transfer of various timing signals for a CCD, LCD, and other devices, and for generation and transfer of various control signals fed to signal processing integrated circuits and other devices.

BACKGROUND OF THE INVENTION

In the prior art, several methods are available for generation and supplying of various timing signals needed for a CCD (charge coupled device), LCD (liquid crystal device), and other devices. As a typical conventional method, a timing generator is used. This timing generator has a signal generating unit for each of plural timing signals needed for the device, such as a CCD. The signal generating units in the timing generator have a certain limited number of waveform change data for prescribed timing signals to be generated. Each signal generating unit has a constitution in which a prescribed one waveform change point data item is selected from plural waveform change data based on the outputs of a horizontal counter and a vertical counter, a prescribed timing signal defining the waveform change is generated based on the selected waveform change point data item, and it is generated at the output terminal. Also, each waveform change data item is realized with a hard wired circuit or by means of waveform data stored in a memory.

For the timing generator with the aforementioned constitution, the timing signal generated at the output terminal of each signal generating unit is limited to the signal of a certain prescribed waveform, and, in order to change it, it is necessary to change the hardware or to change the waveform data stored in the memory.

As another conventional method, there is a timing generator that generates timing pulses for use in driving solid-state image pickup elements. For this type of timing generator, the waveform data are divided into time-sequence data and edge data for storage in a memory (for example, see Patent Reference 1). The time-sequence data contain data for highly repeated and complicated pulses, and the edge data contain data for less repeated pulses. The time-sequence data and edge data are combined to generate desired timing pulses in this constitution. As a result, increase in the data quantity to be stored in the memory can be avoided.

More specifically, the time-sequence data contain plural data blocks, one for each waveform change point, and each data block contains all the waveform change data [of] certain plural timing signals generated with the timing generator. Consequently, it is possible to generate waveform changes for different timing signals generated at the same time. However, even for one waveform change of plural timing signals, it is necessary to set a data block for all the plural timing signals. Also, because the timing signals for the solid-state image pickup element as the object are generated by means of a combination of time-sequence data and edge data, the constitution of the waveform data for signal generation becomes complicated. That is, the waveform data pertaining to a prescribed timing signal cannot be clearly separated from the waveform data of the other timing signals. Consequently, change of the waveform data of a prescribed timing signal itself is not an easy job. In addition, because the time-sequence data and edge data may be combined to generate a timing signal, depending on the timing signal to be changed, it becomes necessary to change both the time-sequence data and the edge data. This is undesirable.

For a CCD, LCD, and other devices, the timing signals needed are different for different manufacturers. Even for products manufactured by the same manufacturer, significant difference occurs for different models. Consequently, for the aforementioned timing generator of the prior art, it is necessary to design a timing generator for each prescribed device. Consequently, it is hard to provide timing signals required by the various devices as the objects.

The aforementioned problems also exist in the case when control signals are generated and fed to signal processing integrated circuits ICs and other devices.

[Patent Reference 1]
Japanese Kokai Patent Application No. 2001-238138 (FIGS. 3, 6)

Consequently, the objective of this invention is to provide a data transfer method and system for generating plural timing signals, etc. for any CCD, LCD, signal processing integrated circuit IC, and other devices.

Another objective of this invention is to provide a type of data constitution of data blocks for use in said data transfer.

Yet another objective of this invention is to provide a method and device for correcting the transfer timing of data blocks in data transfer.

Yet another objective of this invention is to provide a method and device for transfer timing control in controlling the transfer timing of transferred data blocks in data transfer.

Yet another objective of this invention is to provide a method and device for generating timing signals for used in a CCD, LCD, and other devices by combining said data transfer method and device.

SUMMARY OF THE INVENTION

In order to realize the aforementioned objectives, this invention provides a data transfer method characterized by the following facts: in this data transfer method, plural data blocks received with one input channel are transferred to plural output channels; in this data transfer method, said data blocks contain data and a destination identification that indicates the output channels for transfer; said plural data blocks are set with a relative timing with respect to a time standard; in said data transfer method, there are the following steps: a step in which one said data block is received with said input channel, and a step in which said received data block is sent to one of said plural output channels indicated by said destination identification in said data block.

According to this invention, said data in each said data block may represent the events for which a relative timing is defined in said related output channel. Also, the following scheme may be adopted: said data blocks contain timing correction information for correcting said relative timing of said data blocks; and, said data transfer method also includes a step in which timing correction is performed for said data blocks received with said input terminal according to said timing correction information in said data blocks. Said plural data blocks may come from said input channel at a first relative timing. Said plural data blocks may include at least two data blocks having the same second relative timing of the target. Each of said plural output channels may have a fixed terminal set with respect to a prescribed device.

Also, this invention provides a data transfer system characterized by the following facts: in this data transfer system, plural data blocks received with one input channel are transferred to plural output channels; in this data transfer system, said data blocks contain data and a destination identification that indicates the output channels for transfer; said plural data blocks are set with a relative timing with respect to a time standard; said data transfer system contains a selective output means, which means has an input terminal connected to said one input channel and plural output terminals connected to said plural output channels, and which outputs a said data block received with said input terminal to a said output terminal connected to one of said plural output channels indicated by said destination identification in said data block.

According to this invention, said data in each said data block may represent the events for which a relative timing is defined in said related output channel. Also, the following scheme may be adopted: said data blocks contain timing correction information for correcting said relative timing of said data blocks; and, said data transfer system also contains a timing correction means that performs timing correction for said data blocks received with said input terminal according to said timing correction information in said data blocks. Said plural data blocks may come from said input channel at a first relative timing. Said plural data blocks may include at least two data blocks having the same second relative timing of the target. Each of said plural output channels may have a fixed terminal set with respect to a prescribed device. Said output channel may contain a signal generator. Said data may be taken as data for signal generation with said signal generator. Said data for signal generation can be taken as representing signal events in the signals generated with said signal generator. Said signals may be timing signals. Said signal events may be taken as a change in the signal level of said timing signals.

This invention also presents a type of data constitution characterized by the following facts: the data constitution is of data blocks for use in data transfer in which plural data blocks fed to one input channel are transferred to plural output channels; the data constitution is composed of the following portions: a first portion containing a destination identification that indicates one of said plural output channels for transfer of a said data block, a second portion containing data for use in the one above-mentioned output channel, and a third portion containing principal timing information that determines a first relative timing with respect to a time standard of the data blocks fed to said one input channel.

According to this invention, the aforementioned data constitution may contain a fourth portion that contains timing correction information for correcting said first relative timing of said data block to a second relative timing for sending said data block to the one above-mentioned output channel. Also, said plural output channels may contain fixed terminals set for prescribed devices. A said output channel may contain a signal generator. Said data for signal generation may represent signal events in the signal generated with said signal generator. Said signal may be a timing signal. Said signal event may be a signal level change of said timing signal.

Also, this invention provides a transfer timing correction method characterized by the following facts: the transfer timing correction method is for correcting the relative timing in transfer of data blocks from a first relative timing to a second relative timing with respect to a time standard; said data blocks contain the timing correction information from said first relative timing to said second relative timing; in this transfer timing correction method, there are the following steps: a step in which said data blocks are received at said first relative timing, and a step in which the timing for output of said data blocks is corrected corresponding to said timing correction information in said received data blocks.

In addition, this invention provides a type of transfer timing correction device characterized by the following facts: the transfer timing correction device is for correcting the relative timing in transfer of data blocks from a first relative timing to a second relative timing with respect to a time standard; said data blocks contain the timing correction information from said first relative timing to said second relative timing; and this transfer timing correction device is composed of an input channel that receives said data blocks at said first relative timing, and a timing correction means that corrects the timing for output of said data blocks corresponding to said timing correction information in said data blocks received with said input channel.

According to this invention, said input channel can receive at least two data blocks having the same second timing of the target. A said data block can be sent to any one of plural output channels. Said data block may contain data that represent the events defining the relative timing in said output channel of the destination of the data block. Said output channel may contain a signal generator. Said data may be taken as data for signal generation with said signal generator. Said data for signal generation may represent signal events in the signal generated with said signal generator. Said signal may be taken as a timing signal. Said signal event may be taken as a signal level change of said timing signal.

Also, this invention provides a transfer timing control method characterized by the following facts: the transfer timing control method is for realizing the relative timing of transfer with respect to a time standard in transfer of plural data blocks; said data blocks contain first relative timing information and timing correction information for correcting said first relative timing to a second relative timing; in this transfer timing control method, there are the following steps: a first transfer step in which from the data source of plural data blocks, the data blocks are transferred to a single first transfer channel at a first relative timing corresponding to said first relative timing information in the data blocks, and a second transfer step in which said data blocks are received from said first timing means, and the received data blocks are transferred at a timing obtained by correcting said first relative timing corresponding to said timing correction information in said data blocks, so that said second relative timing is realized.

According to this invention, said second step may be a step in which said data blocks are transferred to plural second transfer channels.

In addition, this invention provides a type of transfer timing control device characterized by the following facts: the transfer timing control device is for realizing the relative timing of transfer with respect to a time standard in transfer of plural data blocks; said data blocks contain first relative timing information and timing correction information for correcting said first relative timing to a second relative timing; this transfer timing control device is composed of the following means: a first timing means with the following function: from the data source of plural data blocks, the data blocks are transferred to a single first transfer channel at a first relative timing corresponding to said first relative timing information in the data blocks, and a second timing means with the following function: said data blocks are received from said first timing means, and the received data blocks are transferred at a timing obtained by correcting said first relative timing corresponding to said timing correction information in said data blocks, so that said second relative timing is realized.

According to this invention, said second timing means is for transfer of said data blocks to plural second transfer channels. Said data source may contain at least two data blocks having the same said second relative timing of the target. A said data block can be sent to any one of said plural second transfer channels. Said data block may contain data representing events for defining the relative timing in said second transfer channel of the destination of the data block. Said second transfer channel may contain a signal generator. Said data may be taken as the data for signal generation with said signal generator. Said data for signal generation may represent signal events in the signal generated with said signal generator. Said signal may be taken as a timing signal. Said signal event may be taken as a signal level change of said timing signal.

REFERENCE NUMERALS AND SYMBOLS AS SHOWN IN THE DRAWINGS

In the figures, A represents a data transfer system, 1 represents a data source, 3 represents a data transfer unit, 5 represents an output channel unit, 7 represents an output terminal, 9 represents a device, 30 represents a transfer timing control unit, 32 represents a selection output unit, 50 represents an output channel, 300 represents a first timing control unit, 302 represents a second timing control unit, 300B represents a principal timing control unit, 302B represents a delay control unit, 32B represents a terminal polarity decoder unit.

DESCRIPTION OF THE EMBODIMENTS

In the following, various embodiments of this invention will be explained in detail.

Figure 1:
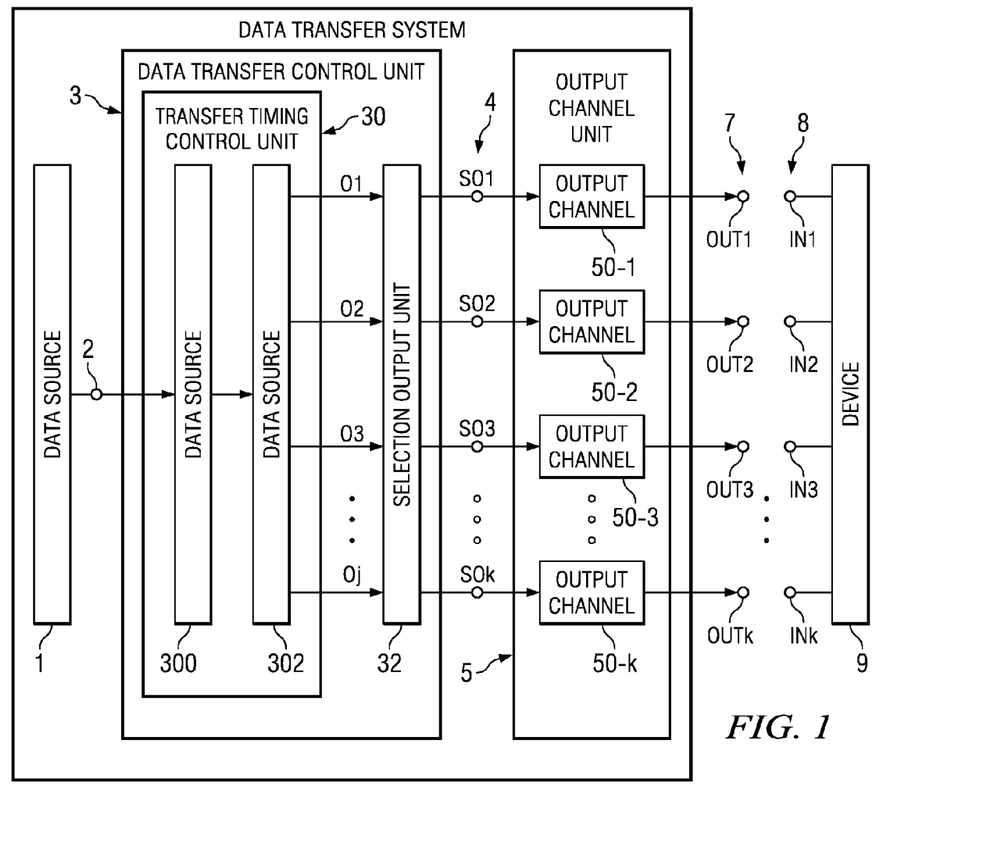
FIG. 1 is block diagram illustrating data transfer system A in the first embodiment of this invention.

FIG. 1 is a block diagram illustrating data transfer system A in Embodiment 1 of this invention. As shown in the figure, this data transfer system A is mainly composed of data source 1, diameter transfer unit 3, output channel unit 5 consisting of k output channels 50-1 to 50-$k$, and k plural output terminals 7, that is, OUT1 to OUTk. In this way, data are fed to device 9 having plural input terminals 8, namely, IN1 to INk. In addition, data transfer unit 3 is composed of transfer timing control unit 30 containing first timing control unit 300 and second timing control unit 302, and selection output unit 32. Here, examples of device 9 include a CCD, LCD, and other devices, a signal processing integrated circuit IC and other devices, as well as equipment, terminals, and other devices.

More specifically, data source 1 is for supplying plural data blocks DB in series to single terminal 2. For example, said data source 1 may consist of a memory, or it may be a wired or wireless transfer line.

Figure 2:
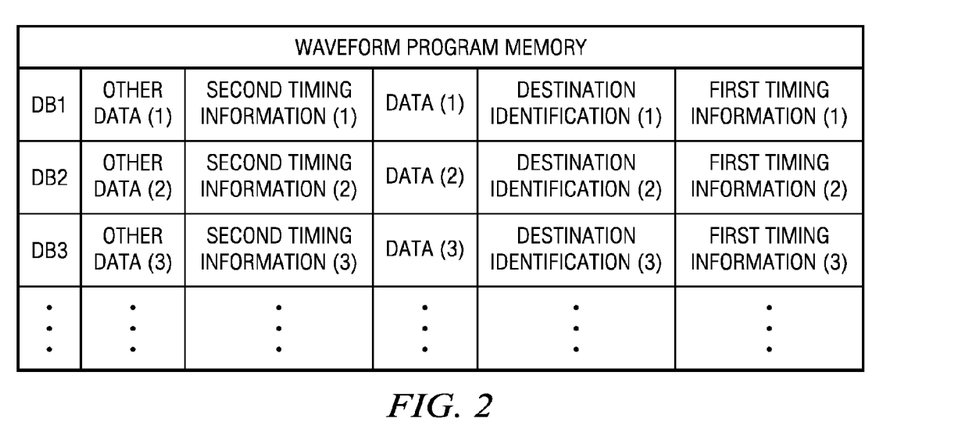
FIG. 2 is a diagram illustrating the data constitution of data block DB.
Figure 3:
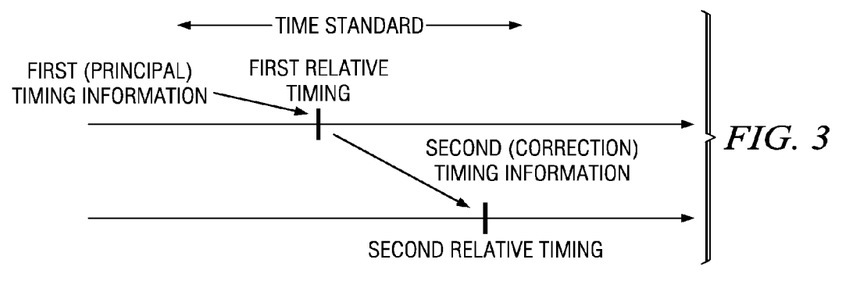
FIG. 3 is a diagram illustrating the first relative timing and the second relative timing with respect to a prescribed time standard, and it shows the relationship between the first timing information and the second timing information for realizing them.

In the following, the data constitution of said data blocks DB will be explained with reference to FIG. 2 and FIG. 3. FIG. 2 shows an example in which [the data blocks] are stored in a waveform program memory (not shown in figure). In this case, plural data blocks DB1, DB2, DB3, etc. form a waveform program. As shown in FIG. 2, each data block is composed of five portions, namely, fields, that is, first timing information field, destination identification field, data field, second timing information field, and another data field. More specifically, the initial field pertains to the transfer timing of the data block, and as shown in FIG. 3, it contains first timing information that defines a first relative timing with respect to a prescribed time standard. This first relative timing may also be taken as the initial relative timing. The destination identification field contains identification of the destination, that is, the transfer destination of the data block, such as the number of one of output channels 50-1 to 50-$k$. For example, the data field contains the data to be transferred to output channel 50. These data may be the taken as event data for controlling events in the output channel. Here, events include the logic level of a certain prescribed signal, yes/no of output of said signal, inversion of the output polarity, and various other states and actions. Also, signals include timing signals, control signals, etc. The second timing information field pertains to the transfer timing of said data block, and, as shown in FIG. 3, it contains second timing information for changing or correcting said first relative timing to a second relative timing. This second timing information may be called "timing correction information" when the first timing information is taken as the principal timing information. Also, the second relative timing may be taken as the last relative timing as the target pertaining to the data block. Said another data field, the last field, contains, say, command information. Examples of command information include commands for instructing processing and operation pertaining to device 9. For example, for a CCD device, the commands include a command for high-speed charge sweep-out, a command for frame shift, etc.

Said data blocks are received with data transfer unit 3 through single terminal 2. Said single terminal 2 forms a single input channel for data transfer unit 3. First timing control unit 300 contained in transfer timing control unit 30 in data transfer unit 3 has an input for receiving data blocks and a single output. The received data blocks are transferred to said single output at the first relative timing based on the first timing information in the data blocks with respect to a prescribed time standard. Second timing control unit 302 having a single input connected to said single output has plural (j) outputs O1 to Oj. The data blocks received with the single input are each transferred to one of outputs O1 to Oj at the second relative timing based on the second timing information in the data blocks with respect to said time standard. As to be explained later, number j in this case is set as a prescribed maximum number as the tolerable number of events that can take place simultaneously in this data transfer system A. Consequently, for example, at output O1, an output free of delay is generated. At output O2, an output delayed by a unit delay is generated. At output O3, an output delayed by twice the unit delay is generated, and so forth. Next, selection output unit 32 has plural inputs connected to outputs O1 to Oj, respectively, and it has parallel plural outputs SO1 to SOk. Based on the destination identification in the data blocks, such as the output channel number, each data block is selectively transferred to one of k outputs. Here, the number k of outputs SO1 to SOk corresponds to the number of the output channels contained in output channel unit 5, that is, the number k of output terminals OUT1 to OUTk.

Output channel unit 5 has k output channels 50-1 to 50-$k$, and each output channel has an input connected to one of outputs SO1 to SOk of selection output unit 32. Each output channel has an output terminal, that is, one of output terminals OUT1 to OUTk, and operation is such that the data themselves in the data block received in the input or data based on said data are transferred to prescribed output terminal OUT. Here, for example, the output channel contains a signal generator, and, data based on the data in the data block may be a timing signal that determines the logic state based on the data in the data block. By connecting output terminals OUT1 to OUTk to input terminals IN1 to INk of device 9, the data output from data transfer system A are fed to device 9.

Figure 4:
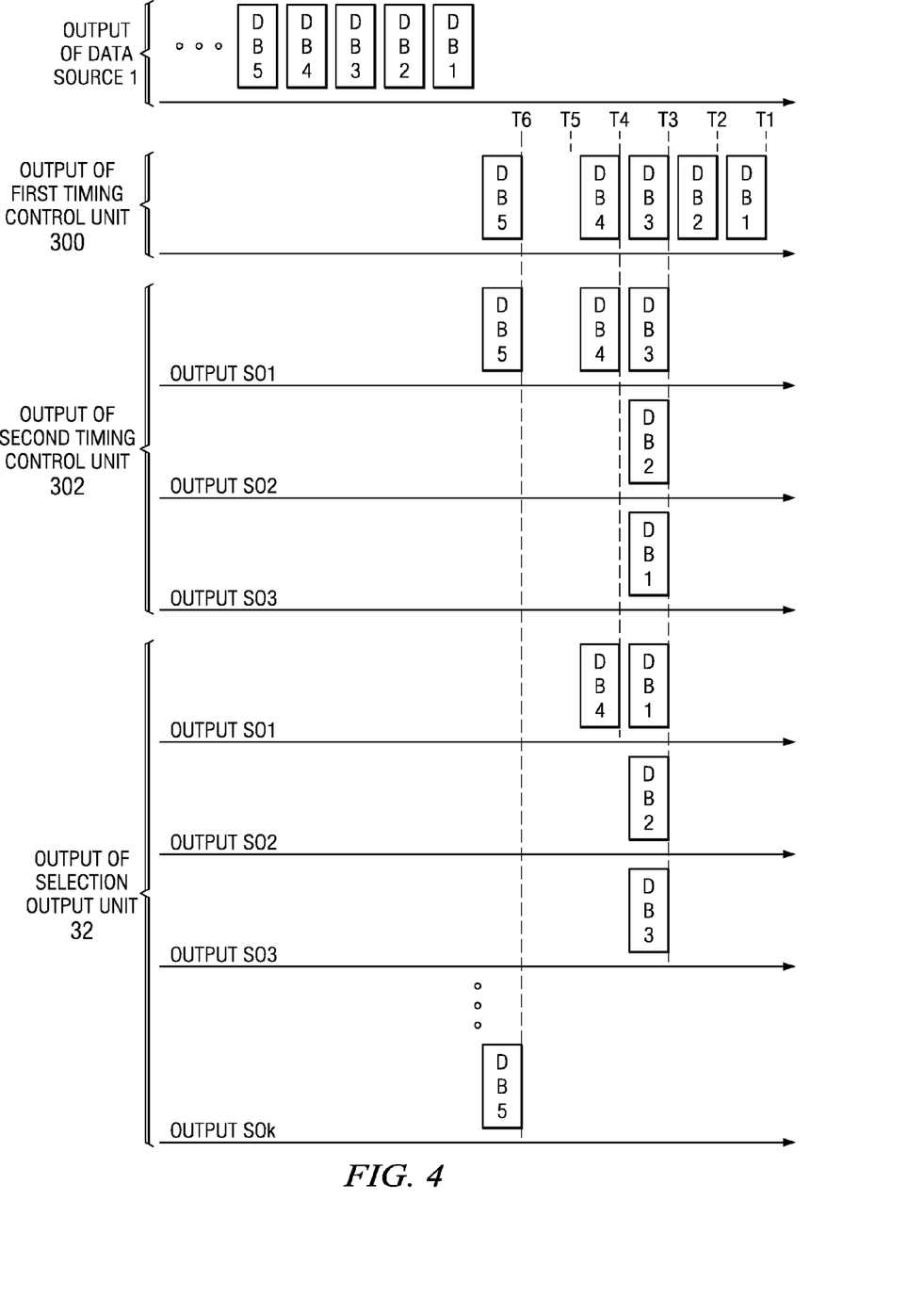
FIG. 4 is a diagram illustrating the timing of transfer of plural data blocks in data transfer system A shown in FIG. 1.

In the following, the overall operation of data transfer system A shown in FIG. 1 will be explained with reference to FIG. 4. In order to facilitate explanation, it is assumed that plural data blocks DB1, DB2, DB3, DB4, DB5, etc. arrive from data source 1 equally spaced by one clock period T. For these data blocks, the first relative timing is taken as T1, T2, T3, T4, T6. As shown in the figure, first timing control unit 300 receiving said data blocks is under transfer timing control based on the first timing information, so that it outputs data block DB1 at relative timing T1, then data block DB2 at relative timing T2, data block DB3 at relative timing T3, data block DB4 at relative timing T4, and then data block DB5 at timing T6 delayed by one clock period T. Then, second timing control unit 302 performs transfer timing control again for said data blocks received in series based on their second timing information. Here, assume that DB1 has 2T delay information, DB2 has 1T delay information, and the other data blocks have 0 delay information. In this case, second timing control unit 302 generates DB1 at time T3 to output O3 that generates a 2T delay output. Similarly, DB2 is generated at time T3 to output O2 that generates a 1T delay output. For the remaining DB3, DB4, and DB5, since the delay is 0, they are generated to output O1 at times T3, T4, T6, respectively, without delay. In this way, three data blocks are transferred in parallel simultaneously. Assume that DB1 and DB4 have destination information that takes output channel 50-1 as the destination, DB2 has destination information that takes output channel 50-2 as the destination, DB3 has destination information that takes output channel 50-3 as the destination, and DB5 has destination information that takes channel 50-$k$ as the destination. In this case, in selection output unit 32, by performing selective output control based on the destination information in the data blocks, DB1 and DB4 are sent to output SO1 for output channel 50-1, DB2 is sent to output SO2 for output channel 50-2, DB3 is sent to output SO3 for output channel 50-3, and DB5 is sent to output SOk for output channel 50-$k$. In FIG. 4, in order to facilitate understanding, delays in transfer between control units 300, 302 and selection output unit 32 are ignored.

As explained above, with data transfer system A of this invention, it is possible to convert plural data blocks transferred in series to data blocks transferred in parallel, and to send the data blocks to their destinations. Also, since each data block contains only the data for one destination, it is easy to separate the data for the various destinations. Also, although each data block contains only the data corresponding to one destination, by means of 2-step timing control, it is still possible to realize simultaneous events at plural destinations. That is, by means of the first timing information that realizes the first relative timing, simultaneous events can be dispersed in time to enable successive handling (including containing in a memory). Then, by means of second timing information added for realizing the second relative timing, it is possible to finally perform plural simultaneous events. By means of the function of selection and output based on the destination information in each data block, it is possible to collect data blocks for plural destinations at one site, such as one memory. Also, since each data block has only the information for one destination, there is no need to contain the information for the remaining destinations in said data block. Consequently, it is possible to reduce the overall size of plural data blocks. Also, in the above explanation, the various data blocks are transferred from the first to the last as existing in data transfer system A. However, as well known to specialists, various fields in the data blocks may be omitted if there is no need to use them.

Figure 5:
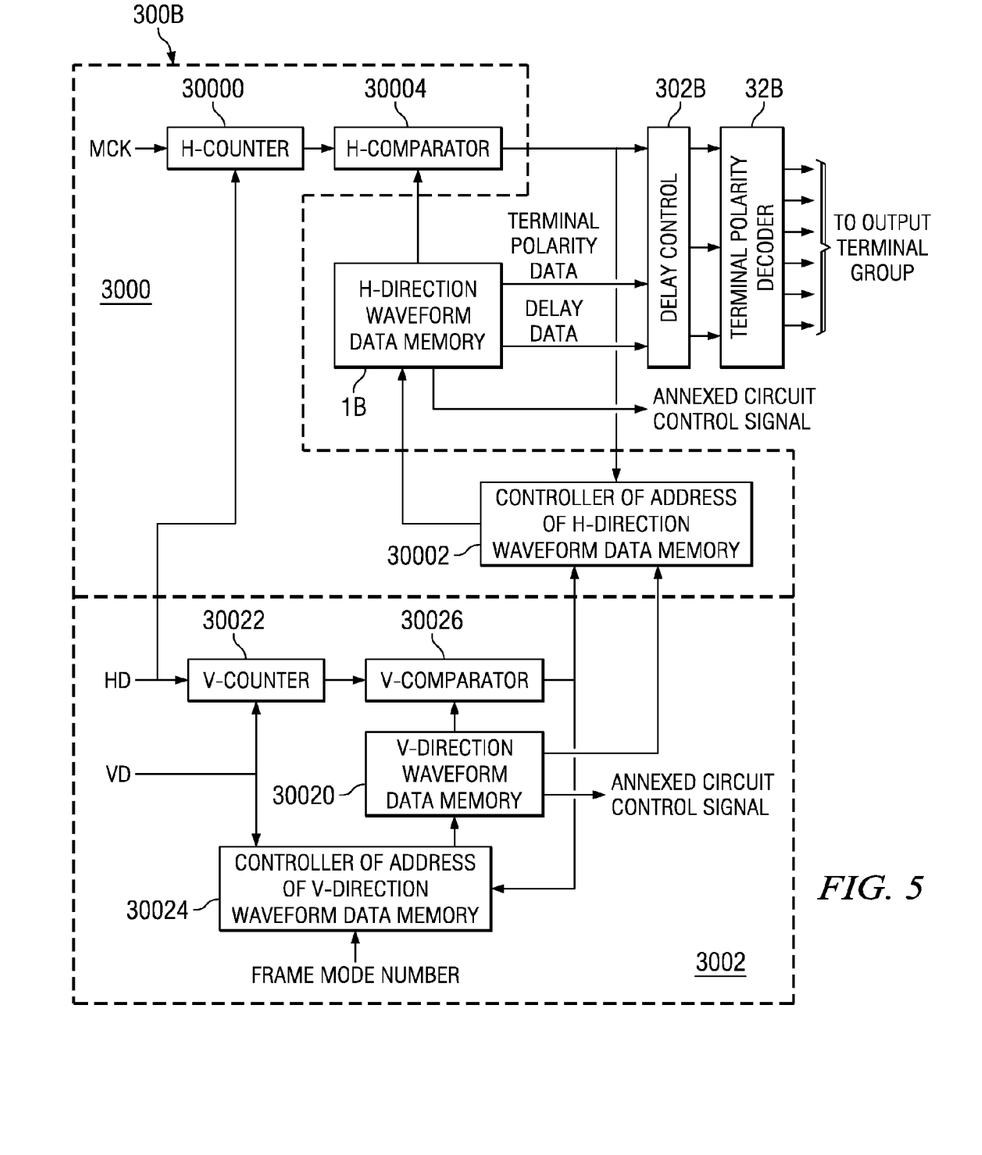
FIG. 5 is a block diagram illustrating timing generator B in an embodiment that shows data transfer system A in FIG. 1 more specifically.

In the following, timing generator B in an embodiment that specifies data transfer system A in FIG. 1 more specifically will be explained with reference to FIG. 5. This timing generator B is for generating and supplying a timing signal to a certain CCD device. In FIG. 5, "B" is annexed behind part numbers of elements corresponding to those in FIG. 1. As shown in the figure, timing generator B has H-direction waveform data memory 1B, principal timing control unit 300B, delay control unit 302B, and terminal/polarity decoding unit 32B, which correspond to elements 1, 300, 302, 32 in FIG. 1. Also, in FIG. 5, there is a signal generator corresponding to each output channel 50 shown in FIG. 1. However, it is not shown in FIG. 5. For example, such a signal generator can be realized with a transistor switch or another switch.

More specifically, principal timing control unit 300B can be divided in concept into horizontal H direction control unit 3000 and vertical V direction control unit 3002. The structural elements include V-direction waveform data memory 30020, a pair of counters (that is, H-counter 30000 and V-counter 30022), a pair of address controllers (that is, H-direction waveform data memory address controller 30002 and V-direction waveform data memory/address controller 30024), and a pair of comparators (that is, H-comparator 30004 and V-comparator 30026). V-memory 30020 contains information of the H-line in the vertical direction. H-direction control unit 3000 receives master clock MCK and horizontal synchronization signal HD. On the other hand, V-direction control unit 3002 receives vertical synchronization signal VD and frame mode number, and it works based on these signals. In this case, the frame mode refers to the mode of operation of, say, a video camera containing a CCD, such as auto-focus operation mode, monitor link operation mode, still operation mode, etc. Also, the frame mode number is the index number that is used in selecting one waveform pattern for use from plural waveform patterns stored in the memory.

Figure 6:
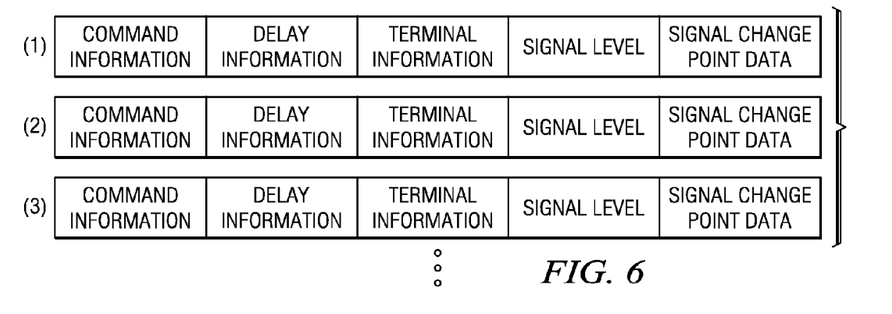
FIG. 6 is a diagram illustrating the data format of the various data blocks in the H-direction waveform data memory shown in FIG. 5.

In the following, with reference to FIGS. 6 and 7, the data format in H-direction waveform data memory 1B and V-direction waveform data memory 30020 will be explained. As shown in FIG. 6, for date format of H memory 1B, each data block contains a signal change point data field (corresponding to the first timing information field shown in FIG. 1), a signal level field (corresponding to the data field shown in FIG. 1), a terminal information field (corresponding to the destination identification field shown in FIG. 1), a delay information field (corresponding to the second timing information field shown in FIG. 1), and a command information field (corresponding to another data field shown in FIG. 1). Here, the signal change point data is the master clock (MCK) number indicating the H-direction time position. The signal level indicates the logic state of the timing signal. A value of "00" corresponds to the logic level "0", while a value of "01" corresponds to the logic level "1". The terminal information is the terminal number indicating one of the plural output terminals of timing generator B. The delay information refers to information that indicates the delay quantity for correcting the H-direction time position that shows the signal change point data. For example, the value of "00" indicates no delay, and the value of "01" indicates a delay of 1 clocking in the master clock. The command information is information pertaining to the command needed for execution of fine control at the timing within the H-line, such as at the start or end of the remaining operation.

Figure 7:
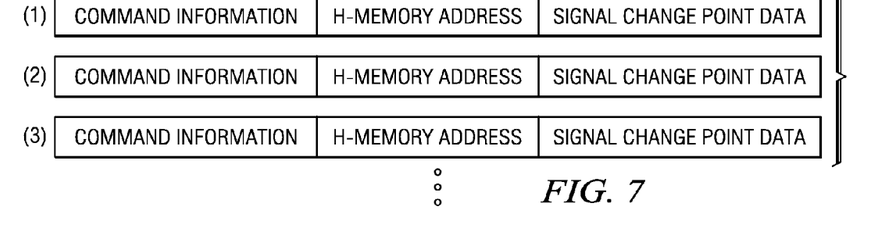
FIG. 7 is a diagram illustrating the data format of the various data blocks in the V-direction waveform data memory in FIG. 5.

Also, as shown in FIG. 7, for the data format of V-memory 30020, each data block is composed of a signal change point data field, an H-memory address/field, and a command information field. In the V-memory data format, the signal change point data indicate the V-direction time position, that is, the H-line number. Also, the command information is information pertaining to a command that is sufficient for controlling the timing with the H-line number, such as information for renewing the frame mode number.

In the following, principal timing control unit 300B will be explained again with reference to FIG. 5. The V-counter receives vertical synchronization signal VD and horizontal synchronization signal HD, the number of horizontal synchronization signals HD after vertical synchronization signal VD is counted, and then, the counting result is generated in the output. V-address controller 30024 receives vertical synchronization signal VD and the frame mode number, and a series of address locations starting from the V-memory address depending on these data are assigned sequentially. V-memory 30020 that receives the V-memory address from V-address controller outputs the contents of the addressed location, namely, the signal change point data, H-memory address, and command information. The V-comparator receives the signal change point data (that is, H-line number) from the V-memory and the count of the V-counter. When they are in agreement, a signal indicating the agreement is output as an agreement signal. The agreement signal is sent to H-address controller 30002 and V-address controller 30024. The V-address controller receives the agreement signal, and outputs the next V-memory address in the series of address locations. In this way, the contents of the series of address locations, that is, the series of data blocks, are sequentially read. On the other hand, the command information output from the V-memory is sent as a control signal to the annexed circuit. Further explanation of the command information is not included here.

H-address controller 30002 is connected such that it can receive the H-memory address output from the V-memory and the output of the V-comparator. When an agreement signal is received from the V-comparator, the H-memory address output from the V-memory is received, so that addresses are assigned sequentially for the series of address locations starting from the H-memory address in H-memory 1B. H-memory 1B generates and outputs the contents of the addressed location, that is, the information shown in FIG. 6, namely, the signal change point data, signal level, terminal information, delay information, and command information. The H-counter receives master clock MCK and horizontal synchronization signal HD, counts the number of the master clock after horizontal synchronization signal HD, and outputs the counting result that represents the time position in the H-line direction. The H-comparator receives the signal change point data (the clock number of the MCK) from H-memory 1B and the output of the H-counter, and, when they are in agreement, generates and outputs an agreement signal. Also, just as for the V-address controller, for the H-address controller, too, when an agreement signal is received from the H-comparator, the next H-memory addresses of the series of address locations are generated. As a result, the contents of the series of address locations, that is, the series of data blocks are read sequentially. In addition, the command information from H-memory 1B is sent as a control signal to the annexed circuit. This, however, will not be explained further.

Delay control unit 302B shown in FIG. 5 has an input connected appropriately to enable reception of the output from the H-comparator, the terminal information and polarity information (terminal polarity data) as a signal level from H-memory 1B, and delay data. The received terminal polarity data are delayed according to the delay data, and are generated at one of the plural outputs. Just as outputs O1 to Ok shown in FIG. 1, plural outputs in a number equal to that of delays are also set in delay control unit 302B. Details of said delay control unit 302B will be explained later. Terminal polarity decoder unit 32B that receives the terminal polarity data from the delay control unit has outputs in a number equal to that of plural signal generators (not shown in the figure) set in timing generator B, and the received polarity data are sent to one among plural outputs that represent the received terminal information. Also, just as is shown in FIG. 1, the plural outputs of terminal polarity decoder unit 32B are coupled to the plural output terminals of timing generator B.

Figure 8:
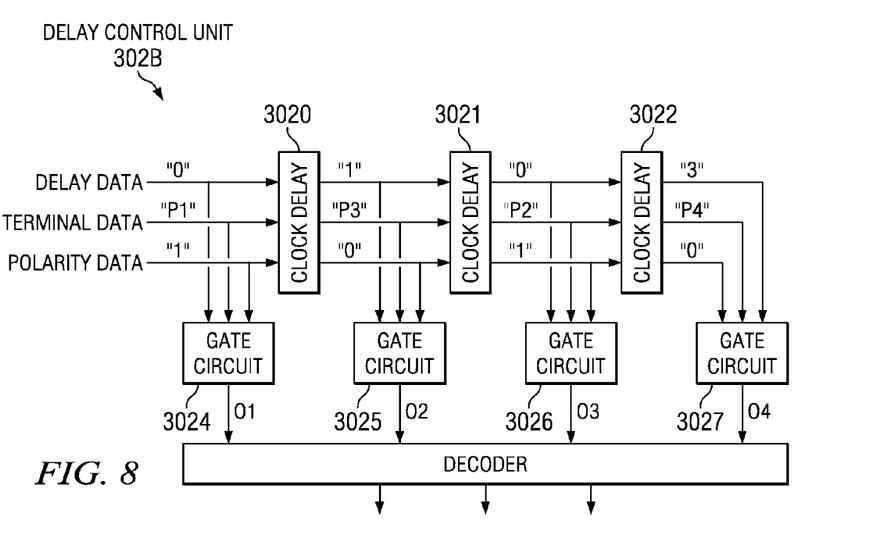
FIG. 8 is a block diagram illustrating a specific circuit in an embodiment of the delay control unit shown in FIG. 5.

In the following, with reference to FIG. 8, a specific circuit in an embodiment of delay control unit 302B shown in FIG. 5 will be explained. As shown in the figure, this delay control unit 302B has three series connected clock delay circuits 3020, 3021, 3022 each generating a delay of 1 clocking of master clock MCK, and four parallel connected gate circuits 3024, 3025, 3026, 3027. Also, in FIG. 8, there is no circuit of delay control unit 302B. Instead, terminal polarity decoder unit 32B is shown. More specifically, clock delay circuit 3020 has three inputs for receiving delay data from H-memory 1B as well as terminal data and polarity data. Also, it has three outputs, that is, a delay data output, terminal data output and polarity data output. The clock delay circuit operates such that the received data are delayed by 1 clocking and, they then pass through unchanged for output. On the other hand, when the delay data is item 0, the fact of no delay is explained, and the data do not pass to the output. Said delay circuit 3020 may consist of a combination of plural flip-flop circuits. Other clock delay circuits 3021 and 3022 also have the same circuit constitution as that of circuit 3020.

For delay control unit 302B, initial gate circuit 3024 has three inputs for receiving the delay, terminal and polarity data on the input side of clock delay circuit 3020. It operates such that when the received delay data item is equal to 0, the received terminal polarity data are allowed to pass to output O1. The remaining gate circuits have the same circuit constitution as that of gate circuit 3024. However, for gate circuit 3025, the input is connected to the input side of clock delay circuit 3021; for gate circuit 3026, the input is connected to the input side of clock delay circuit 3022; and, for gate circuit 3027, the input is connected to the output side of clock delay circuit 3022. For gate circuit 3025, when the received delay data item is unity, the received terminal polarity data are allowed to pass through to output O2. Similarly, for gate circuit 3026, when the received delay data item is equal to 2, the received terminal polarity data are sent to output O3, and for gate circuit 3027, when the received delay data item is equal to 3, the received terminal polarity data are sent to output O4. By means of the aforementioned operation, gate circuits 3024, 3025, 3026, 3027 store the data of delay 0, delay 1, delay 2 and delay 3 by means of hard wiring. Such gate circuits may be composed of OR gates, etc.

Figure 9:
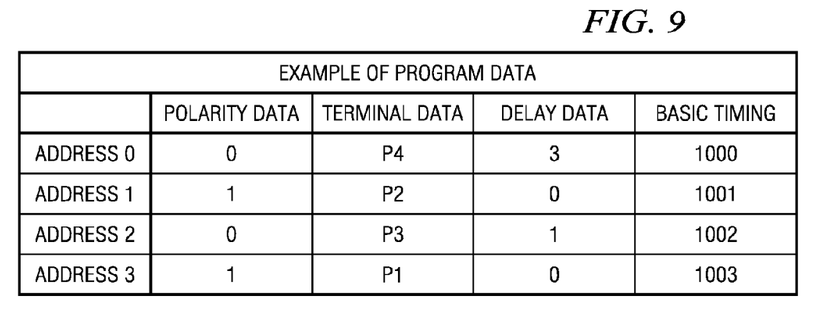
FIG. 9 is a diagram illustrating a program data example for explaining the operation of the delay control unit shown in FIG. 8.

In the following, with reference to the example shown in FIG. 9, the overall operation of said delay control unit 302B shown in FIG. 8 will be explained. In the program data example shown in FIG. 9, the data blocks stored in addresses 0-3 of H-memory 1B shown in FIG. 5 are shown. Because their signal change point data (denoted as basic timing in the figure) are adjacent to each other, these four data blocks are sequentially read from H-memory 1B. Also, the data block stored at address 0 is a 3-clocking delay; the data block stored at address 2 is a 1-clocking delay; and the data blocks at the remaining addresses of 1 and 3 are 0-clocking delays. In this case, as explained above, because the data block at address 0 is a 3-clocking delay, as also shown in FIG. 8, its terminal polarity data are output from output O4 of gate circuit 3027. Then, because the data block at address 1 is a 0-clocking delay, its terminal polarity data are output from output O1 of gate circuit 3024. Also, as shown in FIG. 8, which shows the output side of gate circuit 3026, the gate circuit has a constitution that only allows passage of data with a delay of 2, there is no output from this gate circuit. Also, because the data block at address 2 is a 1-clocking delay, as explained above, it is output from output O2 of gate circuit 3025. Because the data block at the last address 3 is a 0-clocking delay, just as at address 1, it outputs from gate circuit 3024. In this example, finally, the data of the data blocks at address 0, address 2 and address 3 become data that arrive at the same time. In this way, by means of delay control unit 302B, it is possible to generate simultaneous data, that is, data with polarity inversion at the same time point in 2 or more timing signals, from data blocks transferred in series.

Figure 10:
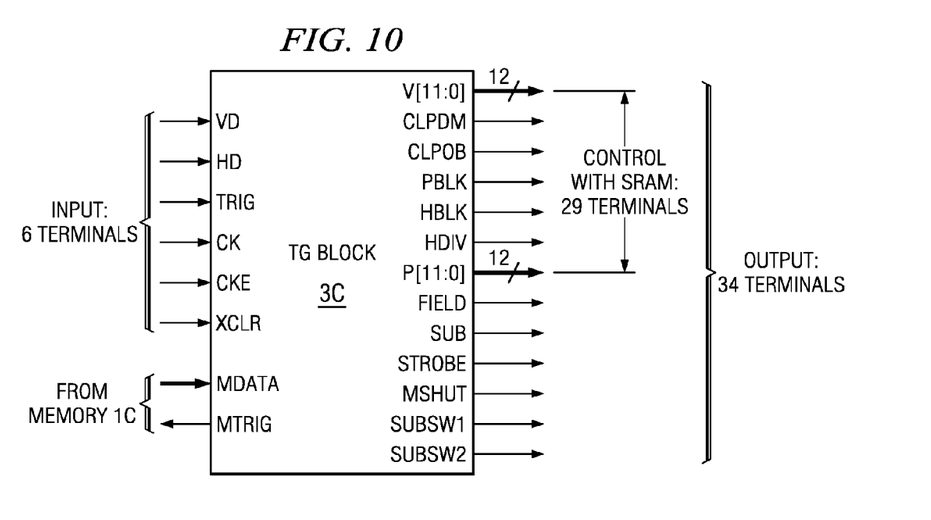
FIG. 10 is a block diagram illustrating timing generator TG C in an embodiment as a specific form of timing generator B shown in FIG. 5.
Figure 11:
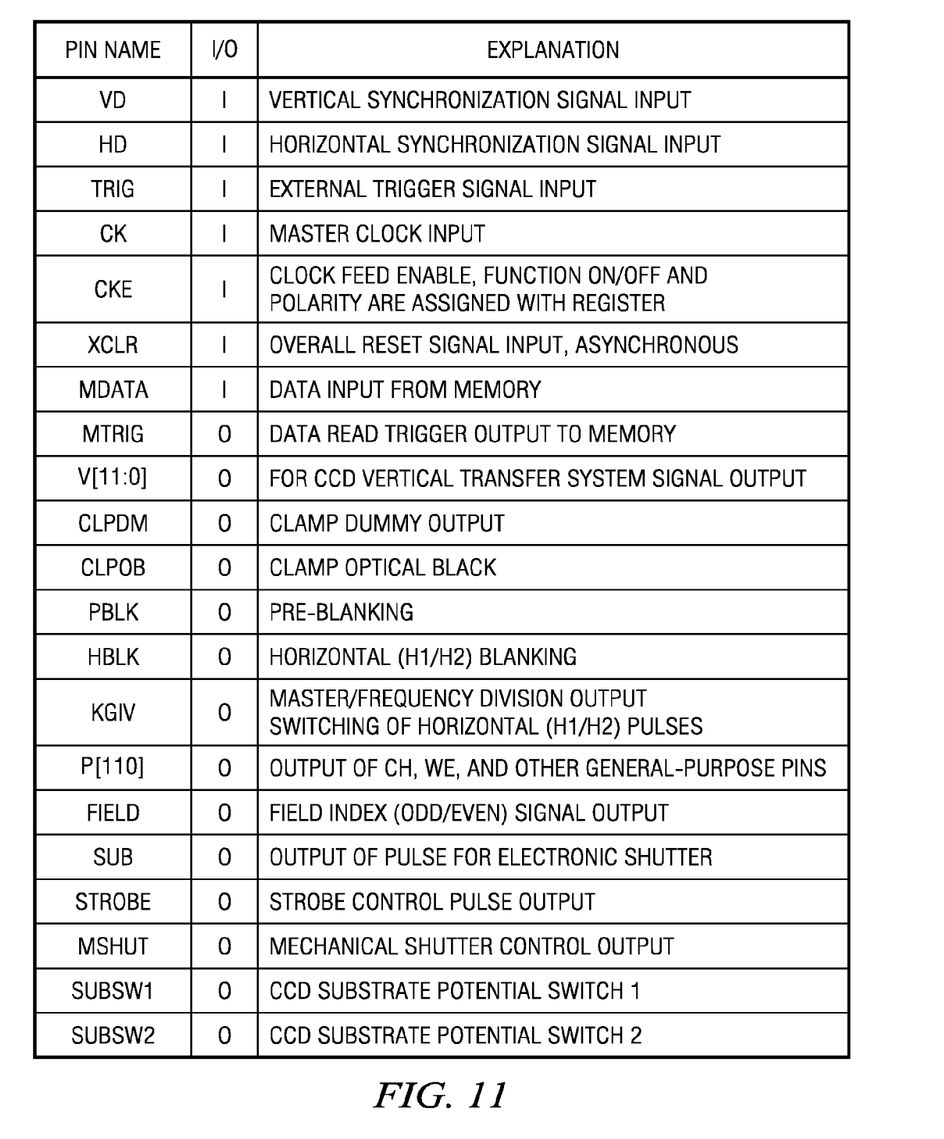
FIG. 11 is a table illustrating the terminals of the TG block in FIG. 10.

In the following, timing generator C in a first embodiment with a more specific constitution of timing generator B will be explained with reference to FIGS. 10-13. This timing generator C is designed to generate the timing signal for a CCD device. FIG. 10 shows timing generator TG block 3C corresponding to the portion of said timing generator C excluding H-memory 1B and V-memory 30020 in FIG. 5. Also, this block contains output channel portion 5 in FIG. 1. Explanation of the various terminals of said TG block can be performed with reference to the table in FIG. 11. An input terminal specifically related to this invention is an SDATA terminal for receiving serial data input from vertical synchronization signal VD, horizontal synchronization signal HD, master clock terminal CK, and memory (shown in FIG. 12). Output terminals that generate the timing signal include horizontal blanking signal HBLK, vertical charge transfer signals V to V, etc. Also, general-purpose pins P to P that can be allotted to generation of any timing signal may be set as output terminals.

Figure 12:
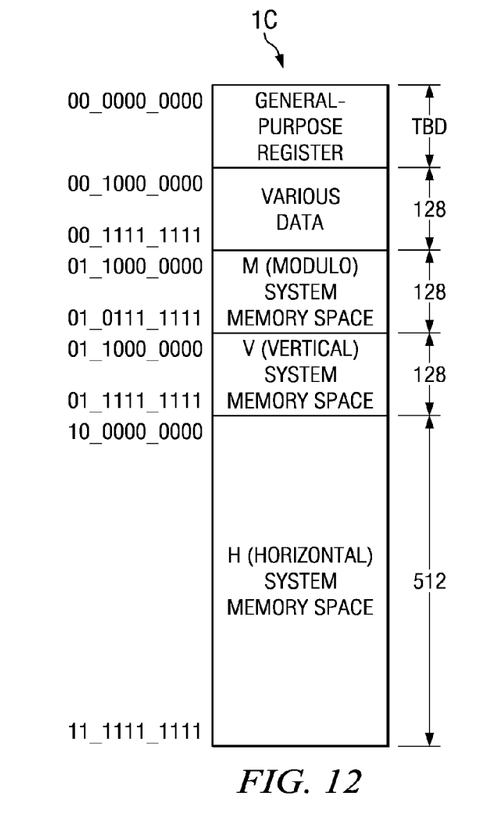
FIG. 12 is a diagram illustrating the overall memory map of memory 1C connected to TG block 3C in FIG. 10.
Figure 13:
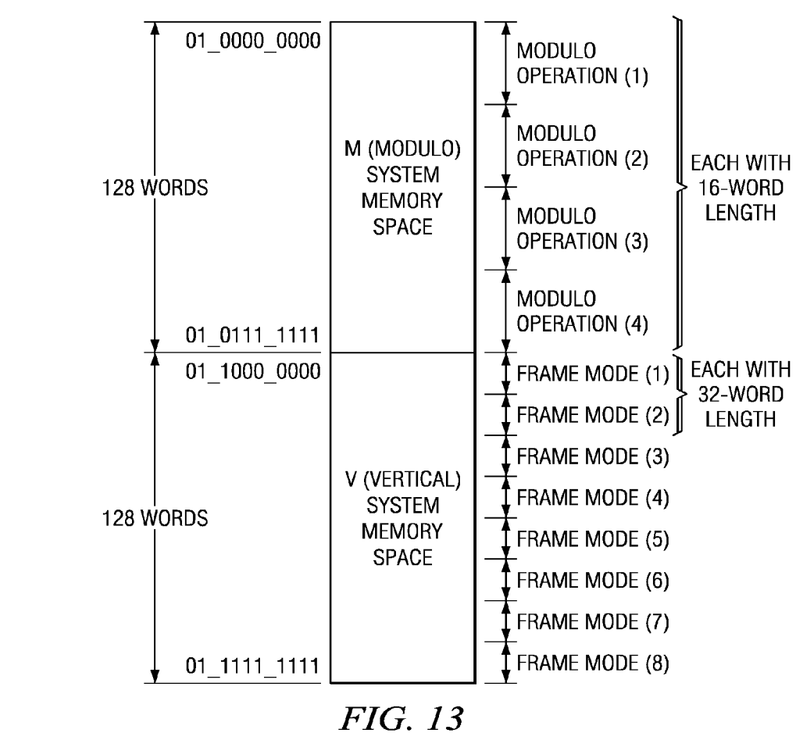
FIG. 13 is a memory map illustrating in detail the V-system memory space and M-system memory space of the memory in FIG. 12.

FIGS. 12 and 13 are memory maps of memory 1C connected to TG block 3C shown in FIG. 10. That is, FIG. 12 shows the overall map of the memory, which has addresses from 00_0000_0000 to 11_1111_1111. Especially, it contains a modulo M system memory space, vertical V system memory space, and horizontal H system memory space. The H-system memory space is an address space corresponding to H-memory 1B in FIG. 5. The V-system memory space is a portion corresponding to V-memory 30020 shown in FIG. 5. As shown in FIG. 13, there is an address space corresponding to each of 8 different frame modes 1-8. Also, for the address spaces of these frame modes, an address is assigned with a frame mode number sent to V-address controller 30024 shown in FIG. 5. The M-system memory space is an address space for execution of four different modulo operations 1-4. In the embodiment shown in FIG. 5, this M-system address space may be taken as within H-memory 1B. Here, modulo operation is a periodic operation asynchronous to horizontal synchronization signal HD, such as a high-speed sweep-off operation.

Figure 14:
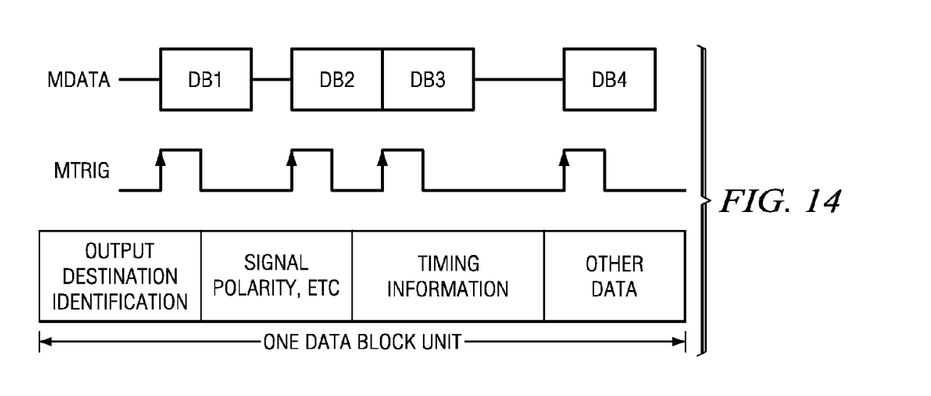
FIG. 14 is a diagram illustrating the timing of serial data transfer from memory 1C to TG block 3C and the data in the various data blocks transferred in FIG. 10.

FIG. 14 is a diagram illustrating the timing of data transfer from memory 1C to TG block 3C in FIG. 10. As shown in figure, the data from the memory are transferred sequentially in data block units to TG block 3C. The various bits in the data block are transferred in series or in bit parallel to TG block 3C. Also, MTRIG represents a trigger signal for reading data from the memory. In this way, the data transfer line from memory 1C to TG block 3C forms a single input channel to TG block 3C.

Figure 15:
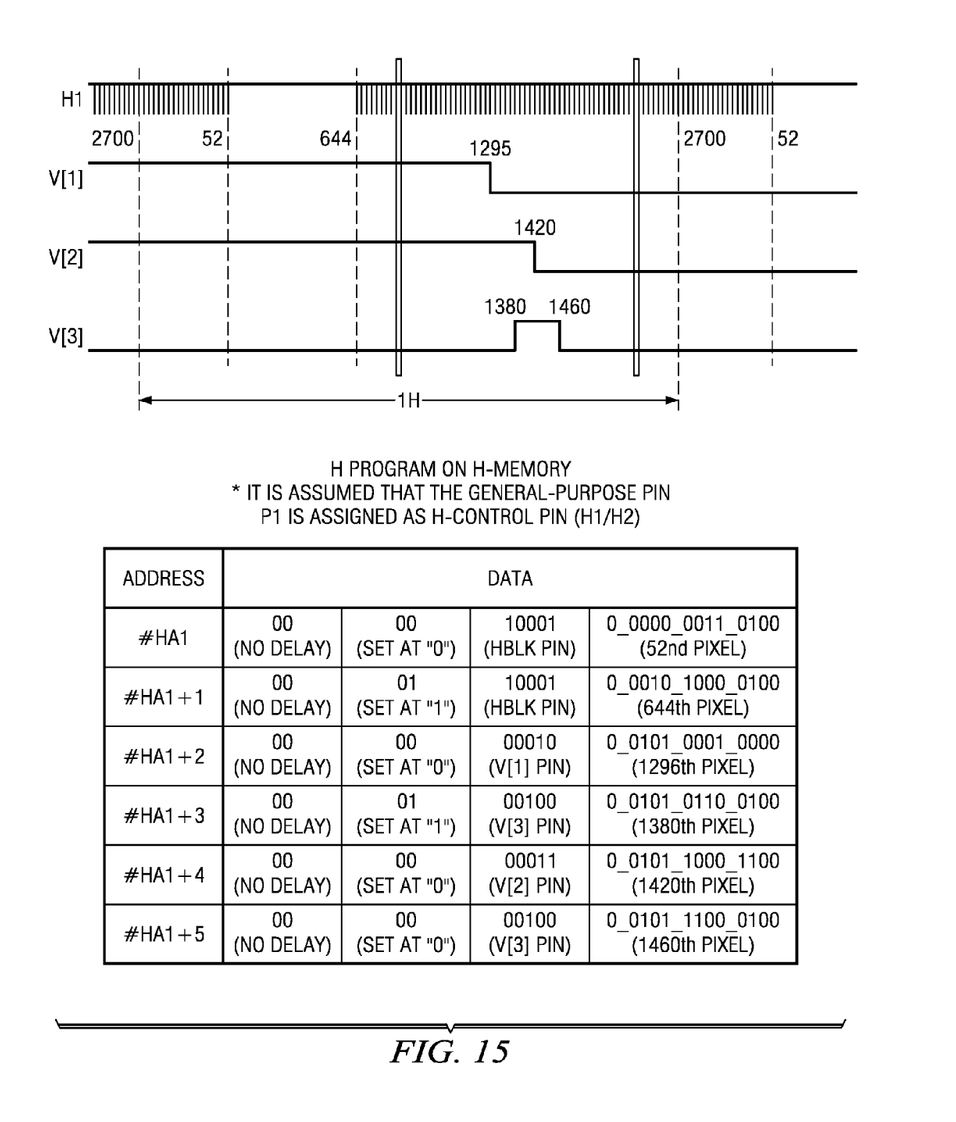
FIG. 15 is a diagram illustrating an example of the timing in the H-direction for the horizontal charge transfer signal and vertical charge transfer signal of a CCD pertaining to timing generator C shown in FIG. 10.

In the following, with reference to FIGS. 15-17, several examples will be explained to illustrate the overall operation of timing generator C shown in FIG. 10. First, in the example shown in FIG. 15, the timing in the H-direction for the CCD horizontal charge transfer signal H1 and CCD vertical charge transfer signal is shown. In this figure, the waveforms of vertical charge transfer timing signals V, V, V as well as the waveform program in the H-memory for generating said waveforms are shown. First of all, horizontal charge transfer signal H1 as the timing signal for controlling charge transfer in the horizontal direction in H1 (row 1) of the CCD will be explained. This signal H1 is made of master clock MCK. This signal stops at the $52^{nd}$ master clock MCK, that is, the $52^{nd}$ pixel, and then starts at the $644^{th}$ pixel. This signal H1 is generated by combining the master clock and the HBLK signal. Its waveform is defined in the two data blocks with waveform program addresses of #HA1 and #HA1+1. That is, in the data block with address of #HA1, the terminal data item of 10001 indicates the HBLK pin, and the signal change point data item of 0_0000_0011_0100 indicates the $52^{nd}$ pixel. In addition, the signal level (polarity) data item of 00 indicates transition to "0", that is, it indicates that clock generation is stopped upon start of blanking. The next data block of 0_0010_1000_0100 indicates the 644$^{th}$ pixel, and the signal level (polarity) data item of 01 indicates transition to "1", that is, it indicates that clock generation is started upon stop of blanking. In this way, the waveform of timing signal H1 is formed with two data blocks.

In the following, vertical charge transfer signals V, V, V as timing signals that control the charge transfer in the vertical direction in V1 (column 1), V2 (column 2), V3 (column 3) of the CCD will be explained. For signal V, at the 1296$^{th}$ master clock MCK, that is, pixel (the 1296$^{th}$ pixel), the logic state changes from "1" to "0". This waveform is defined in the data block at address #HA1+2 of the waveform program. That is, in this data block, the terminal data item of 00010 indicates the V pin, and the signal change point data item of 0_0101_0001_0000 indicates the 1296$^{th}$ pixel. In addition, the signal level (polarity) data item of 00 indicates a transition to "0". In the data block of the next address #HA1+3, for the timing signal at the V pin, it indicates an increase to "1" at the 1380$^{th}$ pixel. In the data block at the next address #HA1+4, for the timing signal at the V pin, it indicates a fall to "0" at the 1420$^{th}$ pixel. In the data block at the last address #HA1+5, it indicates that the V pin falls to "0" at the 1460$^{th}$ pixel. Also, in this example, because the signal change points of timing signals V, V, V are all offset in time, the delay data item is 0.

Figure 16:
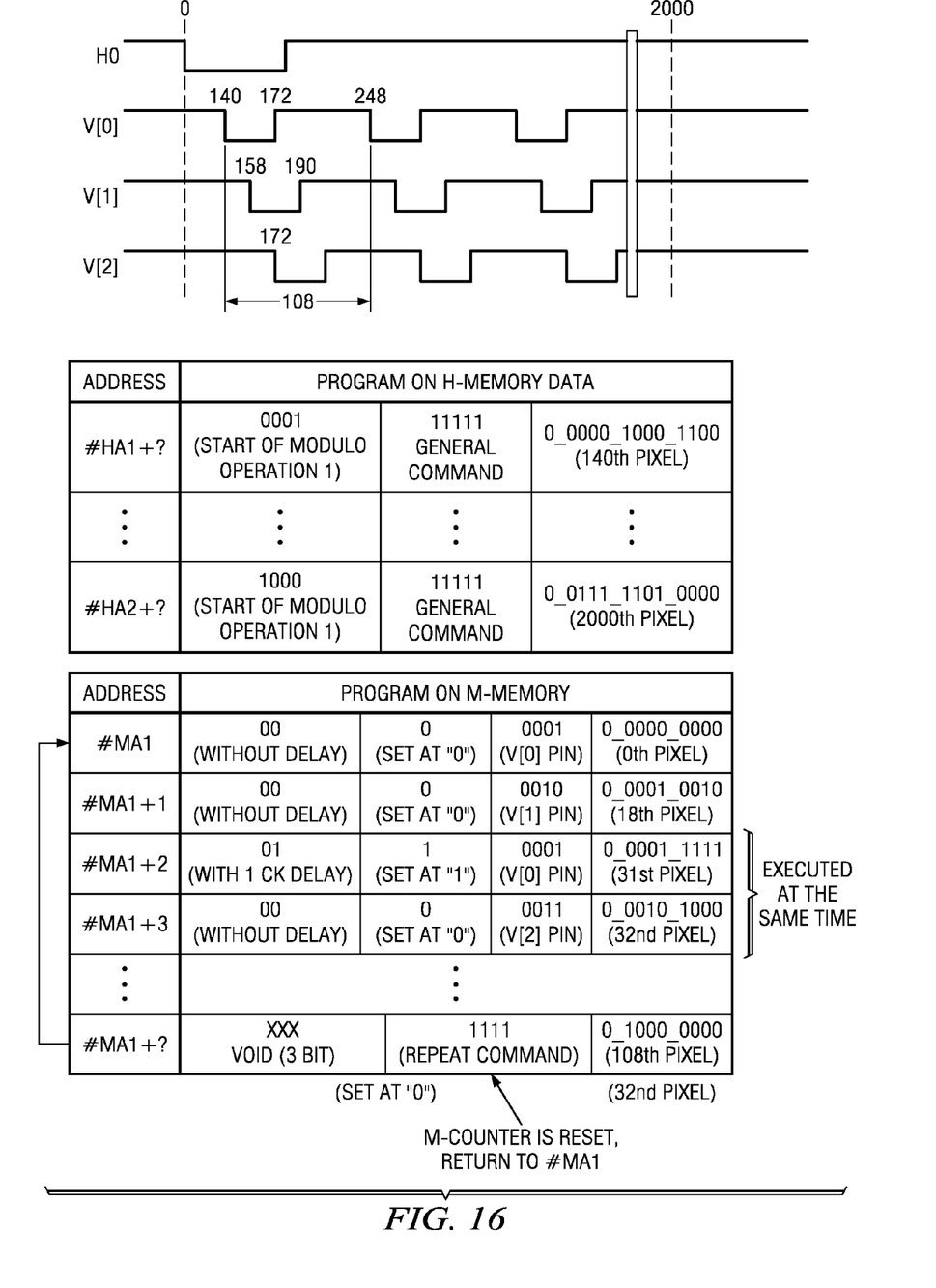
FIG. 16 is a diagram illustrating the timing signal for a CCD vertical transfer in a high-speed sweep-off operation or another high-speed transfer from CCD pertaining to timing generator C shown in FIG. 10.

FIG. 16 is a diagram illustrating the timing signal for CCD vertical transfer in the case of high-speed transfer, such as a high-speed sweep-off operation from the CCD. It shows the waveforms of horizontal synchronization signal HD and CCD vertical transfer timing signals V, V, V, the waveform program stored in the H-system address space (H-memory), and the waveform program stored in the modulo M (residual) system address space (M-memory). More specifically, the data block at address #HA1+? in the H-memory has command information indicating that modulo operation 1 should start at the 140$^{th}$ pixel. As a result, operation is executed by successively reading addresses from #MA1 to MA1+? corresponding to modulo operation 1 of the M-memory. That is, the data block at address #MA1 indicates that the V pin falls to "0" at the 0$^{th}$ pixel, that is, at the 0$^{th}$ pixel counted from the 140$^{th}$ pixel (at address #HA1+? in the H-memory), that is, at the 140$^{th}$ pixel. The data block at the next address, that is, address #MA1+1, indicates that the V pin falls to "0" at the 18$^{th}$ pixel, that is, at the 18$^{th}$ pixel counted from the 140$^{th}$ pixel, that is, at the 158$^{th}$ pixel. The data block at the next address, that is, address #MA1+2, indicates that the V pin rises to "1" at the 31$^{st}$ pixel, that is, at the 31$^{st}$ pixel counted from the 140$^{th}$ pixel, that is, at the 171$^{st}$ pixel (note: not at the 172$^{nd}$ pixel). However, in this data block, since the delay data item indicates a 1-clocking delay, said rise operation is finally executed at the 172$^{nd}$ pixel. The data block at the next address, that is, address #MA1+3, indicates that the V pin falls to "0" at the 32$^{nd}$ pixel, that is, at the 32$^{nd}$ pixel counted from the 140$^{th}$ pixel, that is, at the 172$^{nd}$ pixel. Then, by executing later data blocks (not shown in the figure), the first negative pulse portion at V, V, V is formed. In the data block at the last address #MA1+?, for the 108$^{th}$ pixel (that is, 140+108=248$^{th}$ pixel), under the repeat command, address #MA1 is returned to, and the second and thereafter negative pulse portions in V-V are formed successively. After performing the aforementioned modulo operation for a prescribed number of rounds, in the data block at the last address #HA2+? of the H-memory, the operation comes to an end at the 2000$^{th}$ pixel under a modulo operation stop command instructing stop of the modulo operation. As can be seen from the above explanation, in this example of operation, V and V change polarity simultaneously at the 172$^{nd}$ pixel. This simultaneous change is realized by means of delay data as explained above. That is, by adding a 1-clock delay to the 31$^{st}$ pixel, one can realize the same timing as that of the "timing of the 32$^{nd}$ pixel without delay". It is noted with reference to FIG. 16 #HA1+!, first block, that since it is a general command, the upper 4 bits are taken as command code (usually, bits assigned delay and polarity). It is noted with reference to the #HA1+!, second block, that if the pin assignment portion is ALL1, it is taken as a general command. It is noted with reference to the #HA1+! blocks, that at start of the modulo operation, the M-counter is started. During the operation, the event processing operations of the H-system and M-systems are carried out in parallel. Up to 4 modulo waveform patterns can be registered. It is noted with reference to the #MA1+2 and #MA1+3 blocks, that by applying a delay to execution of the command of #MA1+2, it is possible to execute the command of #MA1+3 at the same time. At the 32$^{nd}$ count of the modulo counter, V1/V3 pins are changed simultaneously.

Figure 17:
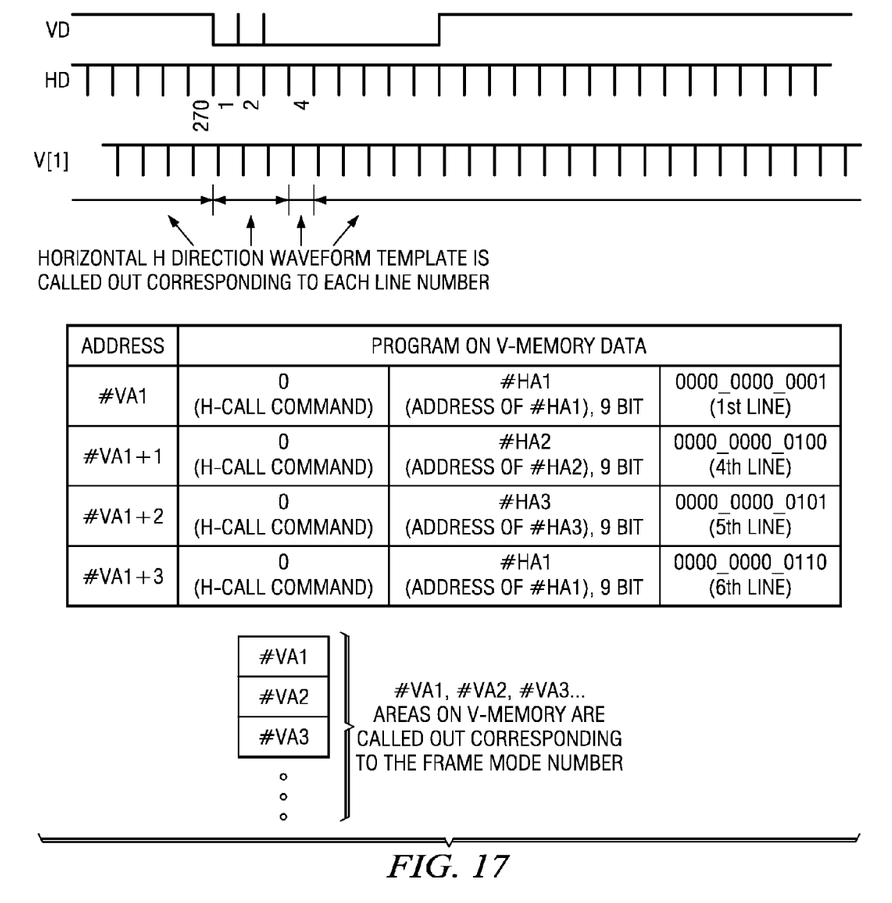
FIG. 17 is a diagram illustrating an example of timing signal generation in the V-direction of timing generator C shown in FIG. 10.

FIG. 17 is a diagram illustrating an example of a timing signal in the V-direction. It shows the waveform diagrams of vertical synchronization signal VD, horizontal synchronization signal HD and V, the waveform program on the V-memory, and the V-system memory space. First of all, for the data block of address #VA1 of the V-memory, it is shown that in the first line, a series of address locations starting from address #HA1 of the H-memory (see H-memory shown in FIG. 15) should be called out from vertical synchronization signal VD. In the example shown in FIG. 15, a series of timing signals are generated from the transition of the HBLK pin to "0" at the 52$^{nd}$ pixel. After completion of this operation, in the data block at the next address #VA1+1 of the V-memory, in the 4$^{th}$ line, by calling out a series of address locations starting from address #HA2 of the H-memory from the vertical synchronization signal VD, just as aforementioned, the timing signal of the 4$^{th}$ line is generated. Then, in the same way as aforementioned, the remaining data blocks in the V-memory are processed.

Figure 18:
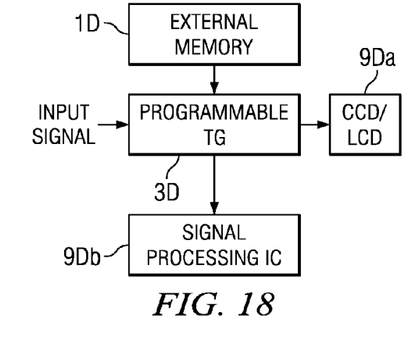
FIG. 18 is a block diagram illustrating an example constitution of an embodiment of a programmable timing generator in this invention.
Figure 19:
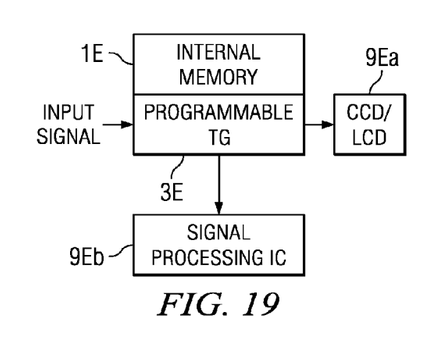
FIG. 19 is a block diagram illustrating an example constitution in another embodiment of a programmable timing generator in this invention.

FIGS. 18 and 19 illustrate an example of the constitution of a programmable timing generator in this invention. Just as timing generator C shown in FIG. 10, in FIG. 18 the memory is also formed as external memory 1D of a programmable TG 3D. Also, as a device for supplying the timing signal, signal processing integrated circuit IC9Db is also contained annexed to device 9Da which contains the CCD and/or LCD. On the other hand, in the example shown in FIG. 19, the memory is made of internal memory IE of programmable TG 3E. Just as in FIG. 18, signal processing integrated circuit IC9Eb is also contained annexed to device 9Ea which contains the CCD/LCD. In this way, according to this invention, for the various devices in the system, it is easy to generate timing signals and control signals entirely from one TG.

For the embodiments of this invention described in detail in the above, various changes can be made. First, in the aforementioned embodiment, as shown in FIG. 2, the first timing information is used as the principal timing information, and the second timing information is used as correction information or delay information. However, it is also possible to use these two timing information items to realize other forms of timing shift. For example, it is also possible to push ahead instead of delaying. Also, one may also use two or more fields containing the principal timing information field as the timing correction information field. For example, it is possible to calculate the delay information from the difference between two timing information items. Second, in the aforementioned embodiment, the data transfer system is explained with respect to data transfer in a circuit or a circuit board. However, this invention may also be adopted in data transfer through a wired or wireless network or another transfer line.

As explained above, according to this invention, by means of the function of selective output of data blocks in data transfer, it is possible to collect data for plural destinations at a single site, and it is possible to simplify the system constitution. As a result, changes in the overall data become easier, and data transfer to plural types of devices can be performed easily. Also, by adopting a data constitution in which each data block contains only the data for one destination, there is no need to contain data corresponding to plural destinations in a single data block. Consequently, it is possible to reduce the overall quantity of data for all the plural destinations. In addition, by means of this 1-data block/1-destination data constitution, it is possible to easily identify the data for each destination. As a result, it is easy to change the data for each destination. In addition, by means of combination of two timing information items, it is possible to generate two or more events at the same time.

The invention claimed is:

1. A data transfer method comprising:
    transferring a plurality of data blocks received with one input channel to a plurality of output channels; the data blocks containing data and a destination identification that indicates the output channels for transfer; and the data blocks being set with a relative timing with respect to a time standard;
    wherein each data block is received with the input channel, and is sent to one of the plurality of output channels as indicated by the destination identification in that data block.

2. The data transfer method described in claim 1, wherein the data in each data block represents events, for which a relative timing is defined, in the output channel indicated by the destination identification.

3. The data transfer method described in claim 1, wherein the data blocks contain timing correction information for correcting the relative timing of the data blocks; and further comprising performing timing correction for the data blocks received with the input channel according to the timing correction information in the data blocks.

4. The data transfer method described in claim 3, wherein the data blocks come from the input channel at a first relative timing.

5. The data transfer method described in claim 4, wherein plural data blocks include at least two data blocks having the same second relative timing for sending.

6. The data transfer method described in claim 1, wherein each of output channel has a fixed terminal set with respect to a prescribed device.

7. Apparatus comprising:
    a transfer timing correction device for correcting relative timing in transfer of data blocks from a first relative timing to a second relative timing with respect to a time standard; the data blocks containing the timing correction information from the first relative timing to the second relative timing; and the transfer timing correction device including:
    an input channel configured and adapted to receive the data blocks at the first relative timing; and
    timing correction circuitry configured, adapted and connected to correct the timing for output of the data blocks corresponding to the timing correction information in the data blocks received with the input channel.

8. A transfer timing control method for realizing the relative timing of transfer with respect to a time standard in transfer of a plurality of data blocks; the data blocks containing first relative timing information and timing correction information for correcting first relative timing to a second relative timing; comprising the following steps:
    a first transfer step in which, from a data source of the plurality of data blocks, the data blocks are transferred to a single first transfer channel at a first relative timing corresponding to the first relative timing information in the data blocks; and
    a second transfer step in which the data blocks are received from the first transfer channel, and the received data blocks are transferred at a timing obtained by correcting the first relative timing corresponding to the timing correction information in the data blocks, so that said second relative timing is realized.

9. Apparatus comprising:
    transfer timing control device for realizing the relative timing of transfer with respect to a time standard in transfer of a plurality of data blocks; the data blocks containing first relative timing information and timing correction information for correcting the first relative timing to a second relative timing; the transfer timing control device means comprising:
    a first timing means for transferring data from a data source of the plurality of data blocks to a single first transfer channel at a first relative timing corresponding to the first relative timing information in the data blocks; and
    a second timing means for receiving the data blocks from the first timing means, and for transferring the received data blocks at a timing obtained by correcting the first relative timing corresponding to the timing correction information in the data blocks, so that said second relative timing is realized.

* * * * *